No. 702,489. Patented June 17, 1902.
I. M. SCHERER.
GAS RANGE UTENSIL FOR TOASTING BREAD, &c.
(Application filed Feb. 20, 1902.)
(No Model.)
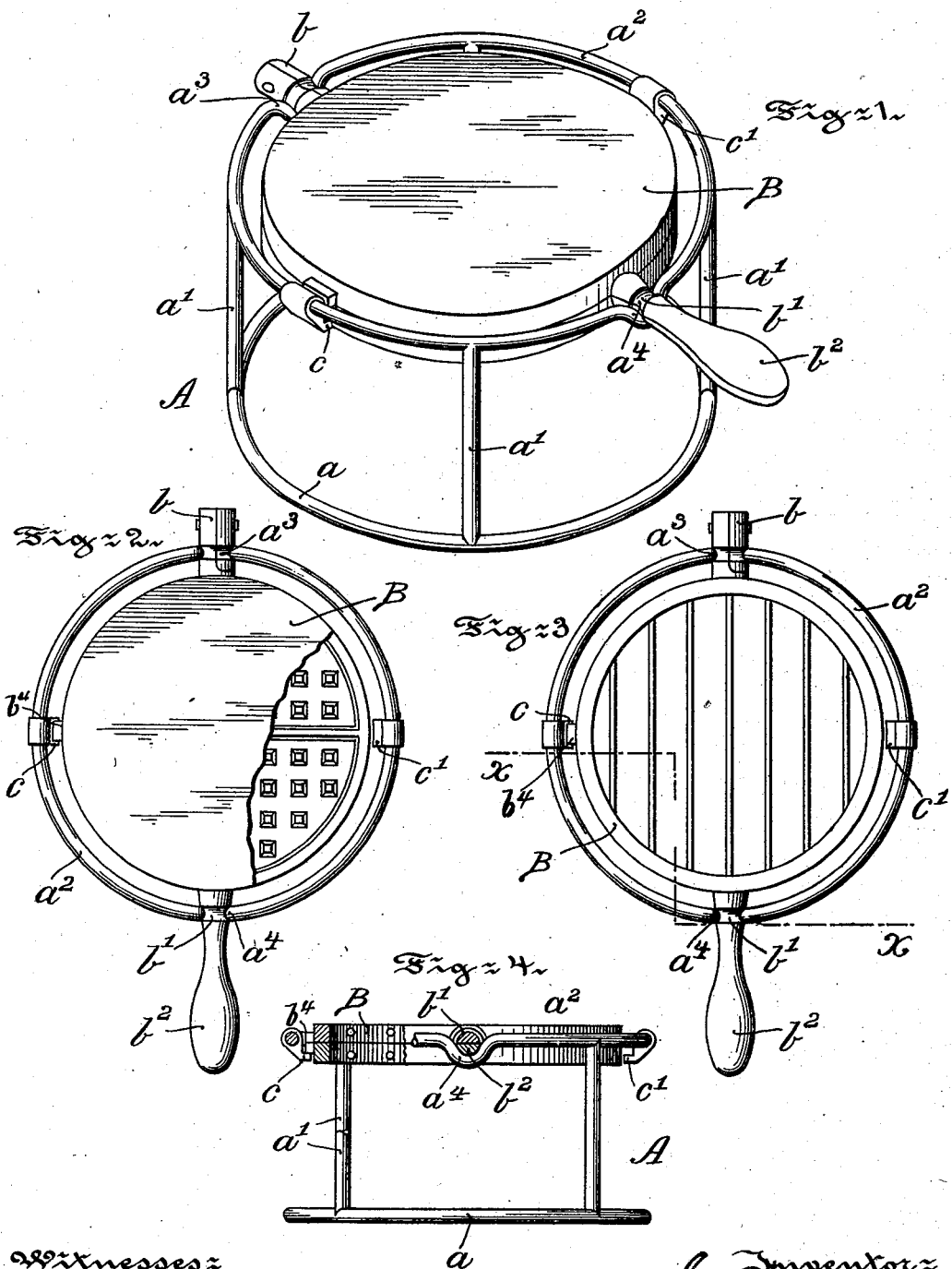

United States Patent Office.

IDA MINA SCHERER, OF PHILADELPHIA, PENNSYLVANIA.

GAS-RANGE UTENSIL FOR TOASTING BREAD, &c.

SPECIFICATION forming part of Letters Patent No. 702,489, dated June 17, 1902.

Application filed February 20, 1902. Serial No. 94,891. (No model.)

*To all whom it may concern:*

Be it known that I, IDA MINA SCHERER, a citizen of the United States, residing at the city of Philadelphia, in the county of Philadelphia and State of Pennsylvania, have invented certain new and useful Improvements in Gas-Range Utensils for Toasting Bread and Making Waffles, of which the following is a specification.

My invention has relation to a device for application to a gas-range for toasting bread and making waffles in which the device for effecting the toasting on both sides of the bread and waffle-making may be readily turned for browning both surfaces by the handle of the appliance without burning the fingers, as well as the toasted bread and waffles as made therein removed without necessarily removing the toasting and waffle-making device or appliance from the gas-range.

The nature and characteristic features of my invention will be more fully understood from the following description, taken in connection with the accompanying drawings, forming part hereof, in which—

Figure 1 is a perspective view of a skeleton frame with its toaster or waffle-making device embodying the features of my invention in operative position. Fig. 2 is a top or plan view, partly broken away, of the same. Fig. 3 is a top or plan view of a toaster of my said invention, and Fig. 4 is a vertical sectional view through the device on the line $x$ $x$ of Fig. 3.

Referring to the drawings, A is a circular skeleton frame consisting of the tubular bottom ring $a$, the series of tubular supports $a'$, and top tubular ring $a^2$, which is indented at $a^3$ and $a^4$ opposite each other for respectively receiving and supporting the grooved portion of the hinged projections or pintles $b$ of the toaster or waffle-iron B and the grooved portion $b'$ of the two-part handle $b^2$. The toaster or waffle-iron B may be made with small projections therein, as in Fig. 2, for waffle-making or in grid form, as in Fig. 3, for bread-toasting. In either case the device is constructed of two parts hinged or pivoted together at the back pintle $b$, the handle $b^2$ being divided horizontally. The top ring of the skeleton frame A is provided with projections or buffers $c$ and $c'$ on opposite sides of the said ring for permitting a lug $b^4$ of the device B bearing on either the buffer or projection $c$ or $c'$ of the top ring of said frame, while at the same time not interfering with the free turning or revolving of the toasting or waffle-making device B by the handle for browning the respective surfaces of the bread or waffle being toasted or browned in the said device B. The handle $b^2$ may be covered with a non-heat-conducting material to permit of handling of the same while the utensil is on the range without burning the fingers.

Having thus described the nature and object of my invention, what I claim as new, and desire to secure by Letters Patent, is—

A frame or support for a waffle-iron or toasting-grid, comprising a bottom, tubular ring adapted to rest upon the gas-range, an upper tubular ring arranged above the lower or bottom ring and forming a frame wherein the iron or grid is adapted to oscillate, said upper ring being indented at two points diametrically opposite to each other to form supports in which the axis of the iron or grid may oscillate, and vertical tubular supports merging in and rigidly secured to both rings, the rings and supports being so arranged that no openings are formed into which dirt or grease may enter, substantially as and for the purposes described.

In testimony whereof I have hereunto set my signature in the presence of two subscribing witnesses.

IDA MINA SCHERER.

Witnesses:
J. WALTER DOUGLASS,
THOMAS M. SMITH.